United States Patent [19]

Houlihan et al.

[11] 3,907,878

[45] Sept. 23, 1975

[54] ACYL SUBSTITUTED PHENYL PROPIONIC ACIDS

[75] Inventors: William J. Houlihan; Jeffrey Nadelson, both of Mountain Lakes, N.J.

[73] Assignee: Sandoz Inc., East Hanover, N.J.

[22] Filed: Feb. 20, 1973

[21] Appl. No.: 333,893

[52] U.S. Cl....260/515 R; 204/158 HA; 260/475 SC; 260/521 R; 260/592; 260/515 A; 424/308
[51] Int. Cl.² .......................................... C07C 65/20
[58] Field of Search......... 260/515 R, 521 R, 515 A

[56] References Cited
UNITED STATES PATENTS 3,352,901  11/1967  Schultz et al. ...................... 260/476
3,352,903  11/1967  Schultz et al. ...................... 260/515

*Primary Examiner*—James A. Patten
*Attorney, Agent, or Firm*—Gerald D. Sharkin; Robert S. Honor

[57] ABSTRACT

Acyl substituted phenyl propionic acids, e.g., 3-(p-pivaloylphenyl) propionic acid, are prepared by hydrolyzing and decarboxylating a(p-pivaloylbenzyl) malonic acid diethyl ester, and are useful as hypolipidemic agents.

7 Claims, No Drawings

ACYL SUBSTITUTED PHENYL PROPIONIC ACIDS

This invention relates to acyl substituted phenyl propionic acids which exhibit hypolipidemic activity. In particular, it relates to alkanoyl substituted phenyl propionic acids, pharmaceutically acceptable salts, their preparation and intermediates thereof.

The compounds of this invention may be represented by the formula:

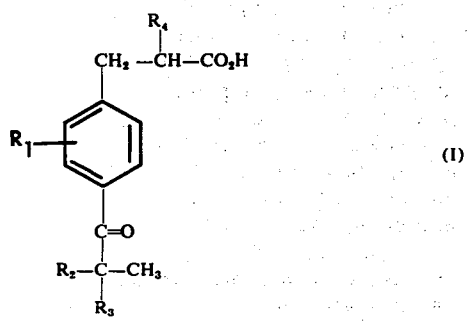

(I)

where
- $R_1$ represents hydrogen, halo having an atomic weight of about 19 to 36, and straight chain lower alkoxy, i.e., straight chain alkoxy having 1 to 4 carbon atoms, e.g., and methoxy, ethoxy, isopropoxy or the like and
- $R_2$ and $R_3$ each independently represent alkyl having 1 to 2 carbon atoms, i.e. methyl or ethyl, and
- $R_4$ represents hydrogen, lower alkyl i.e., alkyl having 1 to 4 carbon atoms, except t-butyl e.g., methyl, ethyl, isopropyl and the like, unsubstituted benzyl or allyl.

The compounds of formula (I) where $R_4$ is other than hydrogen are prepared according to the following reaction scheme:

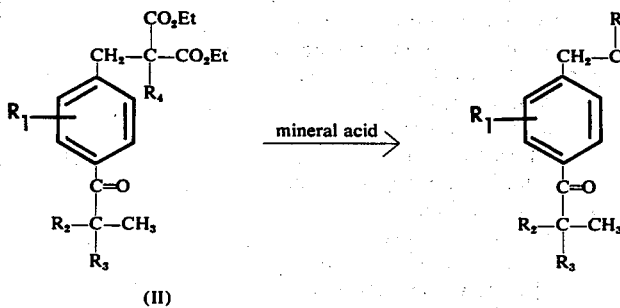

where $R_1$, $R_2$, $R_3$ and $R_4$ are as defined above.

The compounds of formula (I) are prepared by hydrolysing and decarboxylating a compound of the formula (II). The compounds of formula (II) are hydrolyzed employing conventional techniques with an alkali metal base such as sodium or potassium hydroxide, the latter being especially preferred, followed by acidification and spontaneous decarboxylation using a mineral acid in the presence of an aqueous solvent. Suitable acids which can be employed include strong mineral acids, such as hydrochloric acid, sulfuric acid and hydrobromic acid, preferably hydrochloric acid. The aqueous solvent can be water or a mixture of water and a water soluble organic solvent e.g., lower alkanols having 1 to 4 carbon atoms, e.g., methanol, ethanol and the like. The temperature of the reaction is not critical, but it is preferred that the reaction be carried out at the reflux temperature of the solvent. The reaction is run from about 12 to 36 hours, preferably about 18 to 22 hours. The product is recovered by conventional techniques, e.g. crystallization.

The compounds of formula (II) are prepared according to the following reaction scheme:

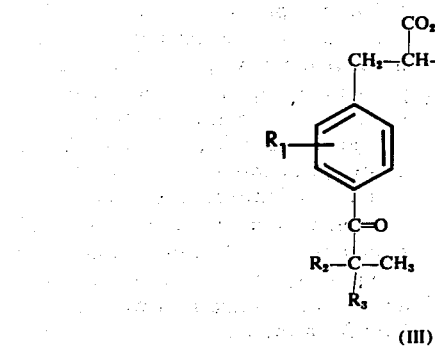
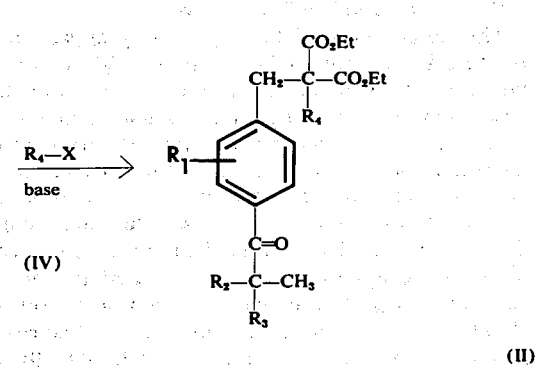

where
X is halo having an atomic weight of about 35 to 80, and
$R_1$, $R_2$, $R_3$ and $R_4$ are as defined above.

The compounds of formula (II) are prepared by treating a compound of the formula (III) with a compound of the formula (IV) in the presence of a strong base such as sodium hydride, potassium hydride, sodium ethoxide or potassium hydroxide, preferably sodium hydride. The reaction is run in the presence of an inert organic solvent such as lower alkanols, dimethylsulfamide, dimethylformamide or tetrahydrofuran, preferably dimethylacetamide. The temperature of the reaction is not critical, but it is preferred that the reaction be run from about 20° to 30°C., preferably about 25°C. The reaction is run from about 12 to 24 hours, preferably about 16 to 20 hours. The product is recovered using conventional techniques eg, crystallization.

The compounds of the formula (III) are prepared by the following reaction scheme:

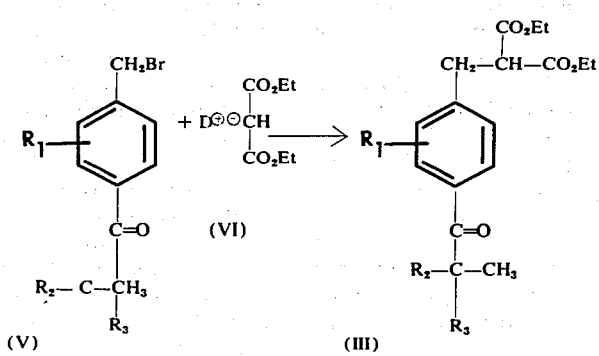

where
D represents an alkali metal such as sodium or potassium, and
$R_1$, $R_2$, $R_3$ are as defined above.

The compounds of formula (III) are prepared by treating a compound of the formula (V) with a compound of the formula (VI) in the presence of a strong base such as sodium hydride, potassium hydride, sodium ethoxide or potassium ethoxide, preferably sodium hydride. The reaction is carried out in the presence of an inert organic solvent such as lower alkanols, e.g. methanol, ethanol and the like, dimethylformamide or dimethylacetamide, the latter being especially preferred. The temperature of the reaction is not critical, but it is preferred that the reaction be run from about 20° to 30°C, preferably about 25°C. The reaction is run from about 12 to 24 hours, preferably about 16 to 20 hours. The product is recovered using conventional techniques e.g., crystallization.

The compounds of formula (V) are prepared according to the following reaction scheme:

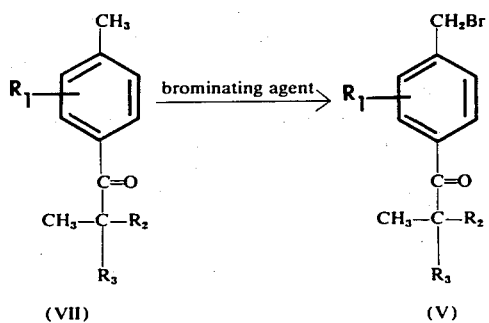

where $R_1$, $R_2$ and $R_3$ are as defined above.

The compounds of formula (V) are prepared by treating a compound of formula (VII) with a brominating agent in the presence of an inert organic solvent and free radical initiator. The brominating agnet which can be used is bromine, N-bromosuccinimide, N-bromo phthalamide, N-bromoacetamide and the like. The particular agent used is not critical, but N-bromosuccinamide is preferred. In the preferred process, the free radical initiator used is an organic peroxide, especially benzoyl peroxide. The reaction can also be carried out under ultraviolet light. Although the particular solvent used is not critical, the preferred solvents are the halogenated hydrocarbons such as methylene dichloride, chloroform, carbon tetrachloride and the like, although the aromatic hydrocarbons such as benzene can also be employed. The temperature of the reaction is not critical, but reflux temperature of the solvent is preferred. The reaction is run for about 12 to 48 hours; preferably about 18 to 25 hours. The product is recovered by conventional techniques, e.g., crystallization.

Many of the compounds of formula (VII) are known and may be prepared by methods described in the literature. The compounds of formula (VII) not specifically disclosed may be prepared by analogous methods from known starting materials.

It will be understood that certain of the compounds of formula (I) in which $R_4$ is other than hydrogen, may exist in the form of optically active isomers. The separation and recovery of the respective isomers may be readily accomplished employing conventional techniques and such isomers are included within the scope of this invention.

The compounds of formula (I) are useful because they possess pharmacological activity in animals as hypolipidemic agents, particularly as hyperlipoproteinemic agents as indicated by the fall of cholesterol and triglyceride levels in male albino Wistar rats weighing 110–130 g. initially. The rats are maintained on drug-free laboratory chow diets for seven days and then divided into groups of 8 to 10 animals. Each group with the exception of the control is then given orally 30 milligrams per kilogram of body weight per diem of the compound for six days. At the end of this period, the animals are anethetized with sodium hexobarbital and bled from the carotid arteries. Serum or plasma samples are collected, and 1.0 ml. samples of the serum are added to 9.0 ml. redistilled isopropanol. Two autoanalyzer cupsful of a mixture of zeolite-copper hydroxide and Lloydds reagent (Kessler, E., and Lederer, H., 1965, Technicon Symposium Mediad Inc., New York, (345–347) are added, and the mixture is shaken for one hour. Cholesterol and triglyceride levels are determined simultaneously on the same sample by Technicon N 24 A (cholesterol) and N-78 (triglyceride) methodology. The mean total serum cholesterol levels are then computed and the hypocholesterolemic activity is expressed as the fill in cholesterol levels as a percentage of the control level. The change in serum triglyceride levels induced by the drug is computed as a percentage of the control triglyceride levels.

For such usage, the compounds (I) may be combined with a pharmaceutically acceptable carrier or adjuvant and may be administered orally or parenterally as such or admixed with conventional pharmaceutical carriers. They may be administered in such forms as tablets, dispersible powders, granules, capsules, syrups and elixers and parenterally as solutions, suspensions, dispersions, emulsions and the like, e.g. a sterile injectable aqueous solution. The dosage will vary depending upon the mode of administration utilized and the particular compound employed.

The compounds of formula (I) may be similarly administered in the form of their non-toxic pharmaceutically acceptable salts. Such salts possess the same order of activity as the free base, and are readily prepared by reacting the base with an appropriate hydroxide or oxide and, accordingly, are included within the scope of this invention. Representative of such salts are the alkali metal salts, e.g., sodium, potassium and the like, the alkaline earth metal salts such as magnesium, calcium and the like.

The hypolipidemic effective dosage of compounds (I) employed in the alleviation of lipidemia may vary depending on the particular compound employed and the severity of the condition being treated. However, in general, satisfactory results are obtained when the compounds of formula (I) are administered at a daily dosage of from about 2.0 milligrams to about 250 milligrams per kilogram of animal body weight, preferably given in divided doses two to four times a day, or in sustained release form. For most large mammals, the total daily dosage is from about 150 milligrams to about 2000 milligrams. Dosage forms suitable for internal use comprise from about 35 to about 1000 milligrams of the active compound in intimate admixture with a solid or liquid pharmaceutically acceptable carrier or diluent.

A representative formulation suitable for oral administration 2 to 4 times a day for the treatment of lipidemia is a capsule prepared by standard encapsulating techniques which contains the following:

| Ingredients | Weight (mg) |
| --- | --- |
| 3-(p-pivaloylphenyl)propionic acid | 150 |
| inert solid diluent (starch, lactose, kaolin.) | 300 |

EXAMPLE I

α-bromo-p-pivaloyl toluene

To a suspension of 28.5 g. (1.17 g. atoms) magnesium turnings in 150 ml tetrahydrofuran under a nitrogen atmosphere there is added 10 ml of 4-bromotoluene (1.17 mole) in 650 ml dry tetrahydrofuran, the reaction is started and the remainder of the bromotoluene solution is added dropwise at a rate that maintains a moderate reflux. After the addition is complete, the mixture is refluxed for an additional 1 ½ hours. The resulting Grignard solution is added dropwise to a cold solution of 128.0 g pivaloyl chloride (1.06 mole) in 500 ml dry tetrahydrofuran at a rate that maintains the temperature at 0 to −5°C. The solution is stirred for an additional 1 ½ hours at 0° and then at room temperature for 18 hours. The mixture is then cooled to 0° and hydrolyzed by the addition of 100 ml 2N hydrochloric acid. The layers are separated and 200 ml of ether is added to the organic phases which is then washed respectively with 100 ml 2N hydrochloric acid, 100 ml. 10% sodium bicarbonate solution and 100 ml saturated sodium chloride. The resulting layer is dried over anhydrous sodium sulfate, filtered, and the solvent is removed vacuo to give p-pivaloyl toluene (b.p. 80°–84°C/0.7 mm,$n_D^{21}$ 1.5108). A mixture of 156.3 g. (0.886 mole) of the resulting p-pivaloyl toluene is then added to 157.8 g. (0.886) mole) N-bromosuccinimide, 4.0 g. (0.016 mole) benzoyl peroxide and 150 ml. carbon tetrachloride and heated at reflux for 18 hours. The mixture is cooled and filtered and the resulting precipitate is washed with carbon tetrachloride. The solvents are removed in vacuo and the resulting oil is distilled in vacuo to give α-bromo-p-pivaloyl toluene (b.p. 124°–132°/0.7 mm, $n^{22}$ 1.5546-V.P.C. 96% monobromo 4%-dibromo).

Following the above procedure and using in place of 4-bromotoluene equivalent amounts of:
  a. 4-bromo-2-chlorotoluene or
  b. 4-bromo-2-methoxytoluene,
there is obtained
  a. α-bromo-2-chloro-4-pivaloyl toluene or
  b. α-bromo-2-methoxy-4-pivaloyl toluene, respectively.

EXAMPLE 2

(p-pivaloylbenzyl)malonic acid diethyl ester

To a cold suspension of 4.66 g (0.194) mole of sodium hydride in 200 ml dimethylacetamide there is added dropwise 28.2 g (0.176 mole) diethyl malonate in 80 ml. of dimethylacetamide maintaining the temperature between 0° and 5°C. Stirring is initiated for two hours at room-temperature and there is then added 40.8 g. (0.16 mole) of α-bromo-p-pivaloyl toluene in 200 ml of dimethylacetamide maintaining the reaction temperature between 20 and 30°C. Stirring is continued overnight at room temperature. Water is then added and the excess dimethylacetamide is removed in vacuo, and the resulting residue is partitioned between petroleum ether and water. The layers are washed with water, and salt water, dried and evaporated in vacuo. The residue is then distilled in vacuo to give p-pivaloyl benzyl malonic acid diethyl ester b.p. 157°–168°C (0.1 mm).

Following the above procedure and using in place of α-bromo-p-pivaloyl toluene an equivalent amount of
  a. α-bromo-2-chloro-4-pivaloyltoluene, or
  b. α-bromo-2-methoxy-4-pivaloyltoluene,
there is obtained
  a. (2-chloro-p-pivaloylbenzyl)malonic acid diethyl ester; or
  b. (2-methoxy-p-pivaloylbenzyl)malonic acid diethyl ester, respectively.

EXAMPLE 3

(p-pivaloyl-α-methylbenzyl)malonic acid diethyl ester

To a cold suspension of 1.6 g of 57% sodium hydride in mineral oul (0.037 mole) and 15 ml. of dimethylacetamide there is added dropwise 11.5 g (0.034 mole) of p-pivaloylbenzyl malonic acid diethyl ester in 45 ml of dimethylacetamide maintaining the temperature between 0° and 5°C. Stirring is initiated for 2 hours at room-temperature and there is then added 4.83 g. (0.034 mole) methyliodide in 15 ml. of dimethyl acetamide maintaining the temperature between 20° and 30°C. Stirring is continued overnight at room temperature. Water is then added and the excess dimethylacetamide is removed in vacuo, and the layers are separated with water and ether. The layers are then washed with water and salt water, dried and evaporated in vacuo. The resulting oil is crystallized from petroleum ether at <30°C. to give (p-pivaloyl-α-methylbenzyl)-malonic acid diethyl ester.

Following the above procedure and using in place of p-pivaloylbenzyl malonic acid diethyl ester an equivalent amount of a. (2-chloro-p-pivaloylbenzyl)malonic acid diethyl ester,
b. (2-methoxy-p-pivaloylbenzyl)malonic acid diethyl ester,
c. (p-pivaloylbenzyl)-benzyl malonic acid diethyl ester, or
d. Allyl-(p-pivaloylbenzyl)malonic acid diethyl ester
there is obtained
  a. (2-chloro-p-pivaloyl-α-methylbenzyl) malonic acid diethyl ester,
  b. (2-methoxy-p-pivaloyl-α-methylbenzyl)malonic acid diethyl ester,
  c. (p-pivaloylbenzyl)benzyl malonic acid diethyl ester, or
  d. Allyl-(p-pivaloylbenzyl)malonic acid diethyl ester, respectively.

EXAMPLE 4

3-(p-pivaloylphenyl)-2-methylpropionic acid

The resulting product of Example 3 is dissolved in 30 ml of ethanol and 30 ml of water and there is then added 5.3 g. of potassium hydroxide. The resulting mixture is refluxed for seven hours. The solvent is then evaporated in vacuo, and the residue is dissolved in water washed with ethyl ether. The aqueous solution is then acidified at 0°C with concentrated hydrochloric acid, extracted with ether, dried and evaporated. The residue is crystallized from petroleum ether to give (p-pivaloyl-α-methylbenzyl) malonic acid. This solid is evaporated in 10 ml. of concentrated hydrochloric acid and refluxed for 21 hours. The resulting mixture is cooled and extracted with ether. The ether is then washed with 2N sodium hydroxide and the basic water is decolorized, and made acidic at 0°C with concentrated hydrochloric acid, extracted with ether, and the ether is then dried and evaporated. The resulting residue is recrystallized from hot petroleum ether to give 3-(p-pivaloylphenyl)-2-methyl propionic acid, m.p. 77.5°-79°C.

Following the above procedure and using in place of (p-pivaloyl-α-methylbenzyl)malonic acid and an equivalent amount of
  a. (2-chloro-p-pivaloyl-α-methylbenzyl)malonic acid diethyl ester,
  b. (2-methtoxy-p-pivaloyl-α-methylbenzyl)malonic acid diethyl ester,
  c. (p-pivaloylbenzyl)-benzyl malonic acid and diethyl ester, or
  d. Allyl-(p-pivaloylbenzyl)malonic acid diethyl ester,
there is obtained
  a. 3-(2-chloro-p-pivaloylphenyl)-2-methyl propionic acid,
  b. 3-(2-methoxy-p-pivaloylphenyl)-2 -methyl propionic acid,
  c. 3-(2-p-pivaloylphenyl)-2-benzylpropionic acid, or
  d. 3-(2-pivaloylphenyl)-2-allylpropionic acid, respectively.

The 3-(p-pivaloylphenyl)-2-methylpropionic acid of this example is an effective hypolipidemic agent when orally administered to an animal suffering from lipidemia at a dosage of 150 mg. four times per day.

EXAMPLE 5

3-(p-pivaloylphenyl)propionic acid

To a solution of 10 g. (0.03 mole) of (p-pivaloylbenzyl)malonic acid diethyl ester in 45 ml of ethanol and 45 ml. of water, there is added 8.4 g (0.15 mole) potassium hydroxide which is refluxed for 5 hours. The solvents are removed in vacuo and the residue partitioned between ether and water. The aqueous layer is made acidic at 0°C with concentrated hydrochloric acid, extracted with ether, dried and evaporated. The resulting oil is treated with 200 ml. of concentrated hydrochloric acid and the mixture is refluxed for 20 hours. The cooled mixture is extracted with ether, the ether extracted with 2N sodium hydroxide and the basic solution is made acidic at 0°C with concentrated hydrochloric acid, extracted with ether, and the ether is then dried and evaporated. The resulting residue is crystallized from ether/petroleum ether to give 3-(p-pivaloylphenyl)-propionic acid, m.p. 77.5° to 78.5°C.

Following the above procedure and using in place of (p-pivaloylbenzyl)malonic acid diethyl ester an equivalent amount of
  a. (2-chloro-p-pivaloylbenzyl)malonic acid diethyl ester, or
  b. (2-methoxy-p-pivaloylbenzyl)malonic acid diethyl ester
there is obtained
  a. (2-chloro-p-pivaloylphenyl)propionic acid or
  b. (2-methoxy-p-pivaloylphenyl)propionic acid, respectively.

What is claimed is:
1. A compound of the formula

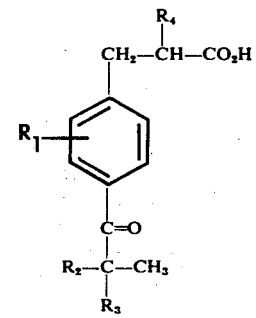

where
  $R_1$ represents hydrogen, halo having an atomic weight of about 19 to 36, or straight chain lower alkoxy, and
  $R_2$ and $R_3$ each independently represent lower alkyl having 1 to 2 carbon atoms, and
  $R_4$ represents hydrogen, lower alkyl having 1 to 4 carbon atoms, except t-butyl, unsubstituted benzyl or allyl,
pharmaceutically acceptable salt thereof.

2. A compound of the formula

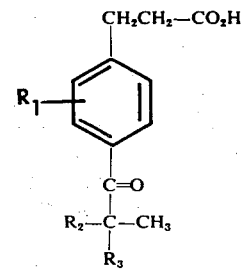

where $R_1$, $R_2$ and $R_3$ are as defined in claim 1, or a pharmaceutically acceptable salt thereof.

3. A compound of the formula

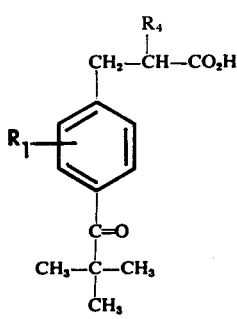

where $R_1$ and $R_4$ are as defined in claim 1, or a pharmaceutically acceptable salt thereof.

4. A compound of the formula

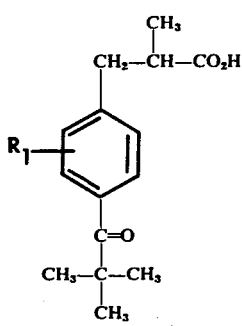

where $R_1$ is as defined in claim 1, or a phramaceutically acceptable salt thereof.

5. A compound of the formula

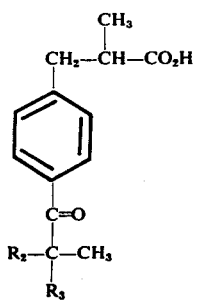

where $R_2$ and $R_3$ are as defined in claim 1, or a pharmaceutically acceptable salt thereof.

6. The compound of claim 1 which is 3-(p-pivaloylphenyl) propionic acid.

7. The compound of claim 1 which is 3-(p-pivaloylphenyl)-2-methyl propionic acid.

* * * * *